United States Patent [19]

Termaat

[11] Patent Number: 4,468,213

[45] Date of Patent: Aug. 28, 1984

[54] METHOD AND APPARATUS FOR SEPARATING FROM EACH OTHER TWO THIN, SLACK SHEETS OF MATERIAL

[75] Inventor: Albertus B. Termaat, Zandvoort, Netherlands

[73] Assignee: Colpitt B.V., Netherlands

[21] Appl. No.: 326,882

[22] Filed: Dec. 2, 1981

[30] Foreign Application Priority Data

Dec. 9, 1981 [NL] Netherlands ............... 8006686

[51] Int. Cl.³ .............. B65B 43/34; B65B 43/36; B65B 61/00

[52] U.S. Cl. .................... 493/213; 493/255; 493/256; 493/268; 29/428; 53/459; 53/410; 53/128; 53/385

[58] Field of Search ........ 53/416, 129, 139.3, 53/459, 410, 385, 570, 128, 564, 575; 29/428; 270/55, 57; 493/255, 256, 268, 212, 213

[56] References Cited

U.S. PATENT DOCUMENTS

| | | | |
|---|---|---|---|
| 3,237,534 | 3/1966 | Lissner | 493/213 X |
| 3,260,170 | 7/1966 | Barraclough | 53/385 X |
| 3,381,446 | 5/1968 | Marchand | 53/385 X |
| 3,474,836 | 10/1969 | Schwake et al. | 53/385 X |
| 3,572,401 | 3/1971 | Nelson et al. | 53/385 X |
| 3,592,004 | 7/1971 | Lense | 53/385 |
| 3,692,301 | 9/1972 | Wetter | 270/55 |
| 3,775,945 | 12/1973 | Kuhnle | 53/385 |
| 4,158,943 | 6/1979 | Lack et al. | 53/385 X |
| 4,183,194 | 1/1980 | Lucke | 53/385 X |
| 4,241,562 | 12/1980 | Meyer | 53/385 X |

FOREIGN PATENT DOCUMENTS 918665 2/1963 United Kingdom .

Primary Examiner—Horace M. Culver
Attorney, Agent, or Firm—McGlew and Tuttle

[57] ABSTRACT

When two sheets of slack material, for example the two sides of a paper or plastics bag, are to be separated by means of a pointed tool, problems arise because the two sheets can easily bend over, both in the same direction. If moreover these sheets are formed from smooth material, they also adhere together by vacuum sealing or by electrostatical forces. The solution for these problems is to enclose the sheets into a positioning block, in which a hollow space is recessed or saved for receiving the volume of the pointed tool to be driven thereinbetween. This driving-in of the pointed tool can be combined with the issuance of pressurized air between the sheets. To this end the pointed tool is provided with grooves for guiding the pressurized air or with a separate blow-pipe slidable over the pointed tool.

9 Claims, 9 Drawing Figures

METHOD AND APPARATUS FOR SEPARATING FROM EACH OTHER TWO THIN, SLACK SHEETS OF MATERIAL

FIELD AND BACKGROUND OF THE INVENTION

Under certain circumstances it may be desirable or necessary to make a separation between two thin sheets of slack flexible material, such as paper or plastic. Since this sheet material has a low resisting moment to bending, such sheets are hard to separate, which certainly is a handicap when processing same in machines.

These sheets can constitute together a bag or may be used for the forming of a bag, and the separation of the sheets is necessary when the bag has to be provided with a valve for filling purposes. The filling can be done by means of a temporarily inserted mouth-piece (in the case of paper bags) or by means of a permanently inserted connecting valve (in case of plastics bags).

To open the bags, that means is to separate the superposed sheets, so that the mouth-piece or connecting valve can be inserted, an attempt is made to drive a pointed object between the sheets. Rather, than opening the bag, however, the two sheets are bent over, both in the same direction and the bag remains closed.

Still more difficult is getting access between a pair of slack sheets when these sheets have a very smooth surface. This is the case with some sorts of paper and virtually with all plastics materials. With such materials there exists a strong adhesion force (vacuumlike adhering). In the case of plastics materials there is still another factor to be added, viz. the fact that handling and processing of the material may provoke high electro-static charges causing the sheets to attract each other.

Accordingly this separation process does not lend itself to mechanisation and constitutes further, due to the labour-intensive character of this operation, the "bottle-neck" in the production.

SUMMARY OF THE INVENTION

The invention has for its object to provide a method and apparatus with which it is possible to separate thin slack sheets from each other mechanically (and thus not manually).

To this end and in conformity with the invention a pair of sheets individually or as part of a pile of sheets is fixed by means of a positioning device and a separating means is then moved toward said pair of sheets and is driven thereinto.

An important measure of the invention is that the separating means is enclosed by a sleeve. This sleeve can communicate with a source of pressurized gas or liquid. This is important when we have to do with sheets adhering together by vacuum or suction sealing, as is the case with plastics sheets. It can be useful then, apart from the separation means, still other means are applied for the separation of the sheets, for example pressurized air.

In order to let the air issue easily, at the circumference of the leading end of the pointed object or mandrel and/or in the periphery of the part of the mandrel adjacent said leading end, a number of longitudinal slots is provided, from where air can issue and can be directed on the pair of sheets to be separated. The supply of air can also be conducted, without using a sleeve or tube, by providing in the mandrel itself an axial bore and by constituting the leading end of the mandrel as a spraying nozzle.

Apart from a pointed object (the separating means) also a blunt object (for example a tube or the like) can be inserted via the from two sheets said connecting valve or spout is slid over the separating means.

If the combination of separating means and sleeve is used, in first instance the work is done with the separating means. This can be established by the measure that the height of the space within which the sheets of plastics are being positioned (clamped), is set at a greater value than the height dimension of the separating means, but smaller than that of the sleeve. To this end filling-in plates can be provided next to the space wherein the mandrel must have the possibility to operate, which plates are fitted to the thickness of the paper or plastics sheets and that of the mandrel so that the sheets are in clamped position below the hold or clamping blocks of the positioning device while the space thus saved for the mandrel yet offers to it sufficient freedom of movement.

If one need not work very often with other sheet thicknesses, it is simpler to provide a hollow space within the two adjacent planes of the hold or clamping blocks meeting each other along the coincident interfaces, in which hollow space the mandrel can be shot between the paper or plastics sheets strongly adhering together.

A next step of the method according to the invention for the insertion of a connecting valve consists in that after insertion of the separating means between two sheets of plastics the position-fixation is released, and that on further insertion of the separating means the enclosing tube (sleeve) is taken along and is also driven between the sheets, and that next the separating means is withdrawn while the enclosing tube (sleeve) is left behind between the sheets.

The invention is also concerned with an apparatus for inserting an object between two closely superposed thin and slack sheets of paper, plastics or similar material, comprising a positioning apparatus formed of the two separate components, of which at least one is movable and can be fixed with respect to the other component in the active position, in which there remains a space between the two components for locating one or more pairs of sheets; and further a hollow space for receiving pointed object which can be moved within said space toward a pair of sheets to be separated.

Furtheron the invention deals with a device for the insertion of a blunt object (such as a tube) between closely superposed slack sheets of paper or similar material while applying the apparatus according to the invention, whereby the tube is slid over the pointed object.

BRIEF DESCRIPTION OF THE DRAWING

In order that the invention may be fully understood, it will now be described with reference to the accompanying drawings, in which.

DESCRIPTION OF THE PREFERRED EMBODIMENTS

Figure 1:
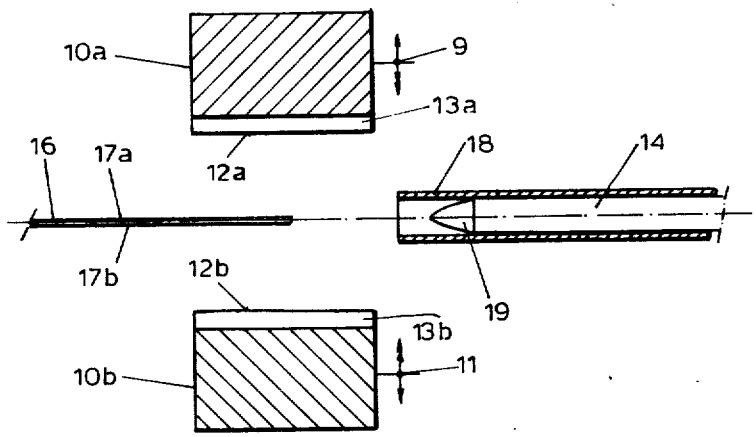
FIGS. 1–3 show some phases of the method according to the invention for driving a mandrel and a tube, if any, between two adhering sheets of slack material while making use of a positioning device.
Figure 2:
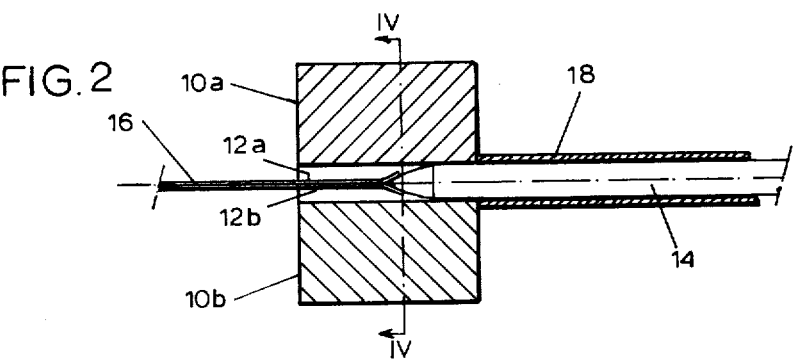
Figure 3:
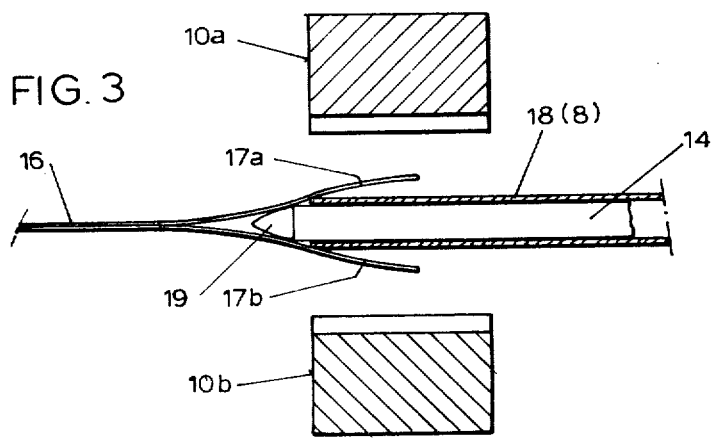

In FIGS. 1–3 are shown some phases of the method according to the invention, in which use is made of a positioning device. As shown in FIG. 1, the device is comprised of two parts: an upper part 10a and a lower part 10b, which act as hold or clamping blocks. Both blocks can be moved up-and-down, as schematically indicated by means of arrows 9 and 11. In another embodiment, however, one block 10b is stationary and the other block 10a is vertically displaceable, and reversely. Arrows 9 and 11 are used to schematically illustrate means for moving the parts 10A and 10B. Within the clamping blocks 12a, 12b where they are facing ech other, a hollow space 13a, b is recessed or saved, in which a separating means or mandrel 14 fits amply. In the space between the blocks 10a and 10b when they have not yet been superposed, a plastics bag 16, for example, is placed. In order to give an idea about the slackness of the material used, it should be noted that the thickness of the bag is only 0.2 mm. The bag 16 can consist of two sheets 17a and 17b which are already sealed together or have still to be sealed together. To facilitate the separation of the sheets 17a and b, pressurized air can be supplied to a tube 18, which can be slid over the mandrel 14.

In FIG. 2 is shown the phase that the plastics bag is tightly clamped between the planes 12a and 12b of the clamping blocks 10a and 10b. Pressure need hardly be exerted or not at all. The block 10a is lowered until a distance of 0.2 mm—that is the thickness of the plastics bag—from the other block 10b, after which the bag is fixed immovably. The mandrel 14 is on the verge of being poached into the hollow space 13 between the sheets 17a and 17b of the bag, whereas the air supply tube 18 is held back. Mandrel 14 is pushed toward the front edges of sheets 17a, 17b.

Soon after that a begin of separation between the sheets 17a and 17b has started by means of the pointed head 19 at the leading end of the mandrel 14, the blocks can be parted, as shown in FIG. 3. Also in this phase supply of air through the tube 18 can still have use, so that the tube together with the mandrel 14 is driven farther or deeper into the bag 16. Next said tube itself can serve as temporary mouth-piece for filling the bag with the product to be packed therein, which mouth-piece has to be slid into the (plastics) bag only a small distance.

In the alternative, a mouth-piece with a larger delivery mouth is slid over the mandrel—for instance to accelerate filling of the (paper) bag—and then the other elements are withdrawn.

Another possibility is that the tube 18 is used as the connecting valve 8 of a plastics bag, which valve is permanently attached to the bottom, in which the mandrel 14 remains helpful to bring the tube completely to the bottom of the bag before it is.

Further details of the apparatus and associated instruments are shown in FIGS. 4–9.

Figure 4:
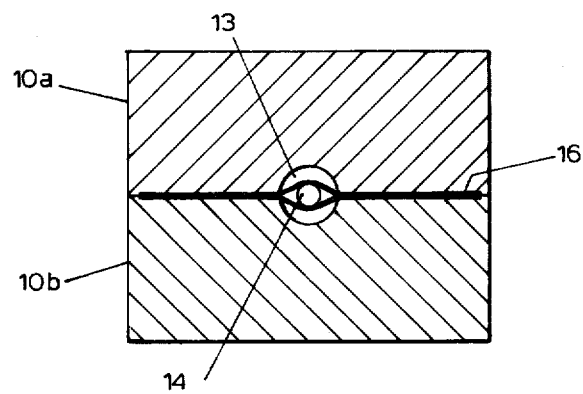
FIG. 4 is a cross-sectional view of such a positioning device.

In FIG. 4 a cross-sectional view of the positioning device taken along line IV—IV of FIG. 2 is shown.

Figure 5:
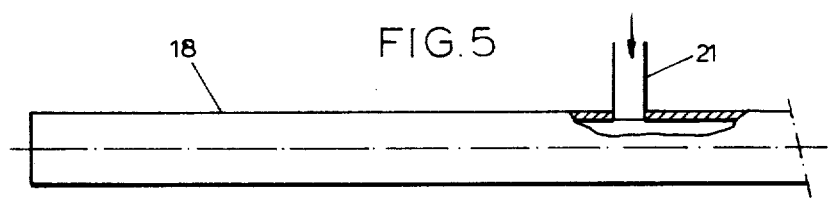
FIG. 5 is a view, partly in cross-section, of a tube for connection to a source of pressurized air.

In FIG. 5 the tube 18 for cooperation with the mandrel 14 of FIG. 2 is shown. The tube 18 carries a connecting means (pipe, tube, etc.) for a source of pressurized air, not-shown.

Figure 6:
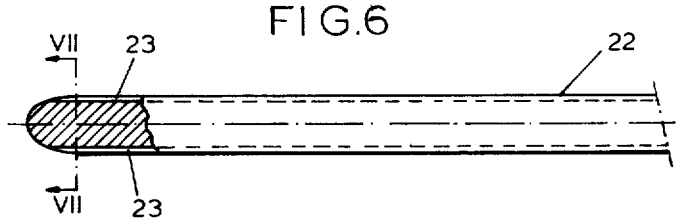
FIGS. 6 and 7 illustrate a mandrel provided with air conducting grooves, for cooperation with the tube of FIG. 5 or with a tube functioning as a connecting valve.
Figure 7:
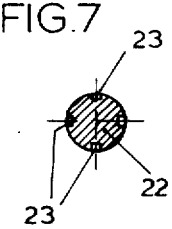
Figure 8:
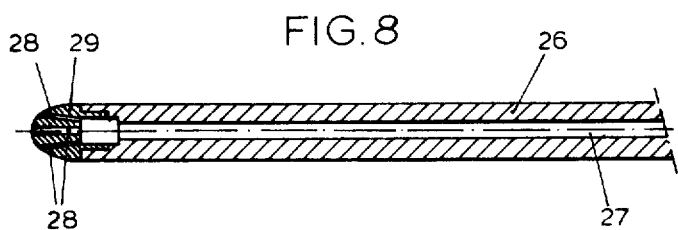
FIGS. 8 and 9 illustrate a hollow mandrel which can be connected to a source of pressurized air without the intermediary of a tube.
Figure 9:
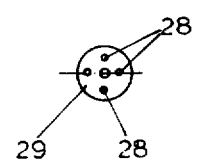

In FIGS. 6 and 8 two types of mandrels are shown. In FIG. 6 the mandrel 22 is solid, but on its periphery it is provided with longitudinal slots 23. From FIG. 7, in which is shown a cross-sectional view of the mandrel 22 taken along line VII—VII of FIG. 6, it appears that there are four slots 23 provided in the circumference of the mandrel 22. When the tube 18 is slid over this mandrel 22, air can easily issue through the slots 23.

FIG. 8 shows a hollow mandrel 26 which can work in principle without the air supply tube 18 but, depending on the nature of the bag thus made or still to be made, can cooperate with a tube, which will act as connecting valve. This mandrel 26, as appears from the Figure, has a central channel 27 and a spraying nozzle 29 through which a number of bores 28 run, viz. in number of five according to FIG. 9.

It will be clear that these embodiments not only work properly with air as driving means for the opening of vacuum-tight bags, but that also water can be used excellently as driving means in these embodiments.

I claim:

1. A method of separating two sheets of slack flexible material from each other, the sheets having facing surfaces contacting each other, adjacent front edges and outer surfaces facing outwardly of each other, the method using a pair of holding blocks and a separating member comprising:

positioning the pair of holding blocks over and into engagement on the outer surfaces of the sheets to hold the sheets in a fixed position, at least one of the holding blocks having a recess extending in a space between the holding blocks and to a portion of the adjacent front edges of the sheets, the recess having a size sufficient to permit the separating member;

moving the separating member into the recess and against the portion of the adjacent front edges of the sheets and between the adjacent front edges of the sheets whereby a space is opened between the sheets in the recess;

the separating member and the recess being elongated and a sleeve being provided over the separating member and movable with respect to the separating member; and blowing fluid into the sleeve for aiding in the separation of the sheets.

2. A method according to claim 1, wherein the recess is dimensioned smaller than the sleeve, including inserting the separating member into the recess, while the sleeve is held against at least one of the pair of holding blocks and out of the recess.

3. A method according to claim 2, including releasing the pair of sheets by moving the holding blocks apart, inserting the sleeve into the space formed between the sheets and withdrawing the separating member from the sleeve while the sleeve remains in the space between the sheets.

4. A method of separating two sheets of slack flexible material from each other, the sheets having facing surfaces contacting each other, adjacent front edges and outer surfaces facing outwardly of each other, the method using a pair of holding blocks and a separating member comprising:

positioning the pair of holding blocks over and into engagement on the outer surfaces of the sheets to hold the sheets in a fixed position, at least one of the holding blocks having a recess extending in a space between the holding blocks and to a portion of the adjacent front edges of the sheets, the recess having a size sufficient to admit the separating member;

moving the separating member into the recess and against the portion of the adjacent front edges of the sheets and between the adjacent front edges of the sheets whereby a space is opened between the sheets in the recess;

and half of the recess being defined in one of the holding blocks and the other half of the recess being defined in the other of the holding blocks, the halves of the recess facing each other, and being elongated, the separating member being pointed and of a diameter at most equal to a space in the direction normal to the outer surfaces of the sheets.

5. A method of separating two sheets of slack flexible material from each other, the sheets having facing surfaces facing and engaging each other, adjacent front edges and outer surfaces facing away from each other, consisting essentially of:

holding the two sheets against at least a portion of their outer surfaces by engaging each outer surface with a holding block;

the two sheets being held in a fixed position with at least a portion of the front edges exposed and a portion of the outer surfaces free of the holding blocks;

inserting a separating member between the front edges in the portion of the front edges exposed and between the portion of the outer surfaces which are free;

providing a sleeve movably mounted on the exterior of the separating member; and after inserting the separating member between the front edges, releasing the sheets and inserting the sleeve into a space formed between the front edges by the separating member.

6. An apparatus for separating two sheets of slack flexible material from each other, the sheets having facing surfaces facing each other, adjacent front edges and outer surfaces facing outwardly from each other, comprising:

a first holding member having a first holding surface;

a second holding member having a second holding surface facing said first holding surface, means connected to at least one of said first and second holding members for moving said first and second holding surfaces toward each other from a spaced apart position to a holding position defining a narrow gap for holding the two sheets therebetween, said first and second holding surfaces defining a recess therebetween with said first and second holding members in said holding position, said recess being elongated and open for receiving at least a portion of the adjacent front edges of the two sheets; and a separating member having a pointed end and adapted for movement into said recess and between the adjacent front edges of the sheets to separate the sheets at least in the area of said recess;

said recess having a dimension normal to said first and second holding surfaces which is at least as large as a dimension of said separating member in said direction.

7. An apparatus according to claim 6, including a sleeve movably mounted on and around said separating member, said recess being smaller in said direction than a dimension in said direction of said sleeve for permitting access to said sleeve only when said first and second holding members are moved out of said holding position.

8. An apparatus according to claim 6, wherein said separating member comprises a separating tube having at least one channel defined therein and an opening and an end of said tube for providing fluid into a space formed between the adjacent front edges of the sheets when said separating member is inserted into said recess.

9. An apparatus according to claim 6, wherein said separating member is cylindrical, said recess being circular and defined half in said first holding surface and half in said second holding surface with the portion of the adjacent front edges held centrally in aid recess.

* * * * *